United States Patent
Zunzer et al.

(10) Patent No.: US 11,827,276 B2
(45) Date of Patent: Nov. 28, 2023

(54) VEHICLE GLASS PANE WITH EDGE PROTECTION

(71) Applicant: Webasto SE, Stockdorf (DE)

(72) Inventors: Andreas Josef Zunzer, Stockdorf (DE); Enrico Müntel, Stockdorf (DE); Florian Grosser, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/524,481

(22) Filed: Nov. 11, 2021

(65) Prior Publication Data

US 2022/0153353 A1  May 19, 2022

(30) Foreign Application Priority Data

Nov. 16, 2020 (DE) .................... 10 2020 130 237.1
Oct. 25, 2021 (DE) .................... 10 2021 127 670.5

(51) Int. Cl.
*B62D 25/06* (2006.01)
*B62D 65/06* (2006.01)
(Continued)

(52) U.S. Cl.
CPC .......... *B62D 25/06* (2013.01); *B62D 27/026* (2013.01); *B62D 65/06* (2013.01); *B60R 13/06* (2013.01)

(58) Field of Classification Search
CPC ...... B62D 25/06; B62D 25/026; B62D 65/06; B60R 13/06; B60J 10/00; B60J 10/30;
(Continued)

(56) References Cited

U.S. PATENT DOCUMENTS 4,571,278 A   2/1986 Kunert
4,775,570 A   10/1988 Ohlenforst et al.
(Continued)

FOREIGN PATENT DOCUMENTS

CN   101486308 A   7/2009
CN   102007010 A   4/2011
(Continued)

OTHER PUBLICATIONS

German Patent Office; Application No. 10 2020 130 237.1; Office Action dated Jun. 14, 2021. (in German with Machine Translation).
(Continued)

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

A glass pane which covers a surface region of a vehicle roof and has an edge protection at a pane edge of the glass pane. The edge protection can be formed by an edge protection strip which covers the glass pane at its pane edge, and a vehicle roof) having such a glass pane, the glass pane being adhesively bonded to a support surface of a roof component of the vehicle roof so as to form a gap between the glass pane and the support surface and the edge protection strip being arranged so as to be contact-free with respect to the support surface and/or contact-free with respect to the adhesive bond of the glass pane to the support surface.

13 Claims, 3 Drawing Sheets

(51) Int. Cl.
B62D 27/02 (2006.01)
B60R 13/06 (2006.01)

(58) Field of Classification Search
CPC . B60J 10/34; B60J 10/70; B60J 10/777; B60J 10/79; B32B 17/10302; Y10T 428/24198; C03C 27/048
USPC ......... 296/210, 216.06, 216.07, 216.09, 215; 49/490.1; 52/204.591
See application file for complete search history.

(56) References Cited

U.S. PATENT DOCUMENTS

| | | | |
|---|---|---|---|
| 5,464,265 A * | 11/1995 | Hemmis | B60J 1/1815 |
| | | | 296/146.14 |
| 5,669,657 A | 9/1997 | Miyazawa | |
| 6,546,683 B1 | 4/2003 | Senge | |
| 8,944,655 B2 * | 2/2015 | Verrat-Debailleul | B32B 17/10761 |
| | | | 362/545 |
| 9,039,075 B2 * | 5/2015 | Sawada | B60J 7/043 |
| | | | 296/216.06 |
| 10,315,349 B2 * | 6/2019 | Krueger | B29C 48/21 |
| 2007/0246973 A1 | 10/2007 | Huebner | |
| 2011/0018303 A1 | 1/2011 | Timmermann | |
| 2011/0115261 A1 | 5/2011 | Platt | |
| 2011/0267833 A1 | 11/2011 | Verrat-Debailleul | |
| 2019/0168488 A1 | 6/2019 | Manz | |
| 2021/0107401 A1 * | 4/2021 | Ferrieres-Zhao | B32B 17/10541 |

FOREIGN PATENT DOCUMENTS

| | | |
|---|---|---|
| CN | 102036844 A | 4/2011 |
| CN | 104647839 A | 5/2015 |
| CN | 107848270 A | 3/2018 |
| CN | 110494310 A | 11/2019 |
| CN | 111032393 A | 4/2020 |
| DE | 3409960 A1 | 10/1984 |
| DE | 3618278 A1 | 12/1987 |
| WO | 2012089309 A1 | 7/2012 |

OTHER PUBLICATIONS

Chinese Office Action of corresponding CN Application No. 202111346364.1 dated Sep. 6, 2023, in Chinese with English Machine Translation (16 pages).
Search Report of corresponding CN Application No. 202111346364.1 dated Sep. 6, 2023, English Machine Translation (2 pages).

* cited by examiner

VEHICLE GLASS PANE WITH EDGE PROTECTION

CROSS-REFERENCE TO RELATED APPLICATION

This application claims priority from German Patent Application Number DE 10 2020 130 237.1, filed Nov. 16, 2020, and DE 10 2021 127 670.5, filed Oct. 25, 2021, which are hereby incorporated herein by reference in their entirety for all purposes.

FIELD

The invention relates to a glass pane which covers a surface region of a vehicle roof and has an edge protection at a pane edge of the glass pane. The invention furthermore relates to a vehicle roof having a glass pane and to a method for providing an edge protection at a pane edge of a glass pane which covers a surface region of a vehicle roof.

BACKGROUND

A glass pane which is arranged on a vehicle roof, for example subsequent to a windshield, is at high risk of its front edge being damaged, in particular during driving operation, by stone chipping. In the case of damage, this leads to high follow-up costs if the glass pane needs to be replaced, for example. In order to address such damage by stone chipping, it is known to provide glass panes or glass elements with foamed edge portions which can prevent stone chip damage. Furthermore, it is known to provide an edge protection composed of soft-elastic rubber-like extruded profiles, for example composed of EPDM, for protection of the pane edge. A further solution offers a substitution of a glass pane with a plastics sheet or a plastics lamella, which is produced for example from PC or PMMA and owing to this material is less susceptible to damage.

However, it is disadvantageous that the application of foam around glass panes is very cost-intensive. Furthermore, soft-elastic rubber-like edge protection profiles are difficult to handle owing to a lack of inherent stiffness and can be applied only with great effort and complicated plant engineering. Furthermore, rubber-like edge protection profiles yield in the case of excessive counterforce due to customary windshield seals, which bear against the edge protection profiles, and then have unclean abutment lines which stand out visually in an extremely negative manner. Here, for example a supporting limb which extends on the edge protection profile downward toward a roof frame may be provided as a remedy. However, the function of such a supporting limb is not sufficiently reliable since it does not offer sufficient positional accuracy in the case of different installation positions in the context of a permissible tolerance range and it also requires a support surface, which is parallel to the pane edge of the glass pane, on the roof frame, which is not always ensured.

SUMMARY

The invention is therefore based on the object of creating a glass pane as mentioned in the introduction which has an improved edge protection, of providing a vehicle roof as mentioned in the introduction having such an improved glass pane, and of specifying a method as mentioned in the introduction which is improved in terms of the aforementioned disadvantages.

The object is achieved according to the invention with the glass pane mentioned in the introduction in that the edge protection is formed by an edge protection strip which covers the glass pane at its pane edge.

Advantageous configurations of the glass pane according to the invention are specified in the dependent claims.

The edge protection strip which is formed as an in particular deformation-resistant plastics profile covers the glass pane at its pane edge. The pane edge is for example the front pane edge of a glass pane in a direction of travel, said glass pane being provided, subsequently to a windshield, for fixed attachment, such as for example by means of an adhesive bond, to a vehicle roof and covering the assigned surface region of the vehicle roof. The covering of the pane edge comprises the covering of the peripheral side of the glass pane at its respective pane edge and in particular also the covering of an outer or upper edge of the glass pane at the pane edge. The glass pane is thus protected by means of the edge protection strip at its or the pane edge, which may for example be angular or rounded, against impacting articles such as for example stones and gravel chips. Furthermore, the edge protection strip may be provided at each side edge of the glass pane and at a rear edge. It is thus also possible for a plurality of edge protection strips to be arranged at a plurality of pane edges of the glass pane.

If the glass pane is a toughened glass or a toughened safety glass, the edge protection strip protects this single-layer glass pane. If the glass pane is of multi-layer form and in particular a laminated safety glass having an inner glass pane and an outer glass pane, the edge protection strip protects this multi-layer glass pane and in particular the outer glass pane and the pane edge thereof.

The glass pane may be of such a size that it can cover the total surface region of a vehicle roof between the windshield and a rear window or a tailgate. On the other hand, the glass pane may for example also represent a planar panel or lamella. Such a planar panel or lamella is expediently arranged so as to adjoin an upper edge of a windshield and covers the surface region between the windshield and a further roof surface part, for example a further glass pane or a roof surface part of a roof module which has for example glass or plastics surface parts or else a fixed or movably mounted cover for a roof opening located in the roof module.

The glass pane is provided for fixed attachment to the vehicle roof, for example to a roof component such as a roof frame of the vehicle roof, but may fundamentally also be a movable cover of an openable roof such as for example a sliding roof or a spoiler roof.

According to a preferred embodiment, it is provided that the edge protection strip is formed as an angle profile and covers the pane edge and an edge strip of a bottom side of the glass pane. The edge protection strip thus leaves a top side of the glass pane, said top side adjoining the pane edge, free of cover or uncovered. As an angle profile, the edge protection strip consequently does not have a profile which is U-shaped in cross section and which is pushed over the pane edge onto the glass pane and covers both the bottom side of the glass pane and the top side of the glass pane in a strip-like region close to the edge.

Expediently, the edge protection strip is formed as an in particular hard plastics profile which is resistant to deformation and bending. Such a deformation-resistant edge protection strip is distinguished in that it has a high inherent stability and in particular a high stability in relation to bending. However, this inherent stability permits deformation to the extent that, during the attachment to the pane edge, the edge protection strip can be adapted by means of mounting force to the two-dimensional or three-dimensional shape of the glass pane at its pane edge and to the profile of the pane edge. This deformation resistance and bending resistance thus differentiates the edge protection strip from soft-elastic or rubber-like edge protection profiles, which are formed for example as parts of seals and are produced for example from EPDM.

The edge protection strip is preferably formed as a plastics profile composed of a plastics material with a bending modulus in the range of greater than 2000 MPa. The high bending resistance is provided by the plastics material in conjunction with the design of the edge protection strip, in particular with the cross-sectional design as an angle profile.

Furthermore, it is preferred that the edge protection strip is formed as a plastics profile composed of a plastics material with a Shore A hardness of greater than 100. In this way, the hard edge protection strip obtains a high deformation resistance for example in relation to denting when struck by objects.

The edge protection strip is expediently formed from a thermoplastic material. In particular, the edge protection strip is formed from a thermoplastic such as ASA (acrylonitrile styrene acrylate). ASA has a high weathering and UV resistance and is hard, impact-resistant and largely scratch-resistant. The edge protection strip is expediently formed as an extruded plastics profile. On account of its deformation resistance, it permanently retains its shape when it is attached to the glass pane. This represents a major advantage over edge protection components or window seals with edge protection which are formed from soft-elastic materials such as for example rubber or EPDM.

According to a preferred embodiment, the edge protection strip is fastened to the glass pane by means of an adhesive bond. An adhesive bond may be effected for example with adhesive or with an adhesive tape. Such fastening allows the edge protection strip to be attached to the pane edge in a direct and positionally accurate manner, the edge protection strip retaining its position regardless of the respective installation position of the glass pane on the vehicle roof. This cannot be ensured in the case of edge protection strips without direct fastening to the pane edge of the glass pane. On account of its fastening to the glass pane and its high stiffness, the edge protection strip permanently retains its high-quality visual appearance in its covering position on the pane edge. On account of its high stiffness, the edge protection strip can be fastened or adhesively bonded to the pane edge without great effort, whereas considerable effort would be required during the attachment of pliable flexible edge protection components to the glass pane on account of their easy deformability and also automatic deformation during mounting.

The fastening or adhesive bonding of the edge protection strip may be effected for example directly on the pane edge of the glass pane. The edge protection strip is expediently fastened or adhesively bonded to the bottom side of the glass pane. The bottom side of the glass pane offers a sufficient and in particular planar adhesive surface, on which the adhesive bond is protected against weathering and which ensures a permanent adhesive bond. The edge protection strip is preferably adhesively bonded to an edge strip, which adjoins the pane edge, of the bottom side of the glass pane. The adhesive bond is consequently arranged so as to be closely adjacent to the pane edge to be protected. This ensures a high stability of the position of the edge protection strip on the pane edge.

The edge protection strip is expediently formed with a fastening base, a fastening portion or a fastening limb and a protective portion or protective limb. The in particular planar fastening portion is provided for attachment of an adhesive or an adhesive tape or the like. The protective portion can expediently be designed to perform its protective function largely independently of the fastening portion.

According to a preferred embodiment, it is provided that the edge protection strip is formed as an angle profile having a fastening limb, which has a fastening or adhesive surface, and having a protective limb, which is angled with respect to the fastening limb and bears against the pane edge of the glass pane. The fastening limb preferably extends approximately at a right angle with respect to the protective limb. This angled and in particular right-angled design makes it possible to correctly position the edge protection strip on the glass pane in a simple manner. In particular, this makes it possible to fix the protective limb in a defined position with respect to the top side of the glass pane. The inner side of the protective limb bears against the pane edge. In dependence on the shape of the glass pane at its pane edge, the inner side of the protective limb may bear for example against the total surface of the pane edge—as viewed in the direction of the thickness of the glass pane—or may make contact only in a strip-like contact region. If the glass pane is a laminated safety glass, the protective limb expediently bears only against the edge of the outer flat glass pane. The protective limb may be spaced apart from the edge of the inner flat glass pane, in particular if the edge of the inner flat glass pane is set back slightly in relation to the edge of the outer flat glass pane.

A free space or cavity may be formed between the edge protection strip attached to the pane edge and the pane edge or a region of the pane edge. The free space or cavity may accommodate for example a connection cable, which for example makes contact with a switchable film integrated in the glass pane. The free space or cavity may be formed by a shaping of the pane edge for example with an indentation or a groove and/or by a shaping of the edge protection strip for example with an indentation or a groove.

It is expediently provided that the edge protection strip or the protective limb ends largely or completely at the same level as the top side of the glass pane. A significant protrusion of the edge protection strip or of the protective limb beyond the top side of the glass pane is thus avoided, with the result that the visual appearance of a smooth vehicle roof outer skin is also maintained. A small protrusion of the edge protection strip or of its protective limb beyond the top side of the glass pane may accordingly also be provided.

However, it may also be provided that the edge protection strip or its protective limb protrudes slightly beyond the top side of the glass pane. As a result of this design, the edge protection strip or its protective limb can cover an upper edge of the glass pane at its pane edge. This design may also further improve the edge protection.

It is expediently provided that the glass pane has a pane edge which extends in a three-dimensionally curved manner and that the edge protection strip has a curved shape which is adapted to this profile of the pane edge. The edge protection strip is formed as a deformation-resistant plastics profile with a curvature before it is fastened or adhesively bonded to the glass pane. The edge protection strip may be formed at least with a two-dimensional bend or curvature. A two-dimensional curvature or 2D curvature is understood to mean a curvature in a plane, such that the edge protection strip corresponds, for example, to the curvature of the projection of the front pane edge of the glass pane on a horizontal plane or to the curvature of the projection of the front pane edge of the glass pane on a vertical plane. On the other hand, the edge protection strip may also be formed with a three-dimensional bend or curvature or 3D curvature which is largely or completely adapted to, or matches, the three-dimensional shape of the, for example, front pane edge of the glass pane.

In this way, the profile of the edge protection strip can be adapted to the profile of the respective pane edge such that, by way of substantial or complete matching to the profile of the pane edge, low-stress or stress-free adhesive bonding of the edge protection strip to the glass pane can be effected. This ensures simple and good applicability. In this way, it is possible to obtain improved adhesion and adhesive bonding in particular in the case of adhesive tapes which during the initial adhesion are sensitive to loadings or stresses that occur and may come loose.

The bend or curvature may be generated for example on an extruded plastics profile by subsequent heating in a contoured shape. During the extrusion, the plastics profile may also be produced with a 3D curvature or else with a 2D curvature in a substantially more favorable production method. An edge protection strip produced with a 2D curvature is adapted, for example, to a planar curvature of the front or rear pane edge of the glass pane.

The edge protection strip may have a coating. The coating is for example a low-friction or protective coating applied by spraying or a layer applied by extrusion. The edge protection strip may be coated completely or only in certain regions.

Furthermore, the object is achieved by a vehicle roof having the features of claim 12. In the case of such a vehicle roof, it is provided that the glass pane is adhesively bonded to a support surface of a roof component of the vehicle roof so as to form a distance or gap between the glass pane and the support surface. In this case, the edge protection strip is arranged so as to be contact-free with respect to the support surface and/or contact-free with respect to the adhesive bond of the glass pane to the support surface. The support surface of the vehicle roof is formed for example on a roof frame or on a flange or the like.

Advantageous configurations of the vehicle roof according to the invention are specified in the dependent claims.

According to an expedient embodiment of the vehicle roof, it is provided that the edge protection strip is arranged so as to be contact-free with respect to a spaced-apart and adjoining roof surface component.

If the support surface or a roof frame forming the support surface, or the like, has shapes which deviate from an ideal design, such as for example local curvatures, elevations or indentations or the like, these are compensated during the adhesive bonding of the glass pane by the adhesive bond, for example by an adhesive bead. The glass pane can thus always be attached in a positionally accurate manner to the vehicle roof and relative to adjoining components. The contact-free arrangement of the edge protection strip with respect to the support surface of the vehicle roof or with respect to the adhesive bond of the glass pane or an adjoining roof surface component can thus prevent collisions of the edge protection strip which would otherwise be possible from being able to occur even in the case of dimensional deviations of the support surface or of the roof frame that exceed the customary tolerance range. Such collisions and resultant deformation of the installed edge protection strip may adversely affect the visual presentation of the installed edge protection strip.

Expediently, a seal, which seals a gap with respect to a roof surface component which is adjacent to the pane edge of the glass pane, bears against the edge protection strip by way of a flexible sealing lip.

Finally, the object is achieved by a method for providing an edge protection at a pane edge of a glass pane which covers a surface region of a vehicle roof and the pane edge of which has a curved profile, it is provided
 a) that an edge protection strip is extruded from a thermoplastic,
 b) that the edge protection strip
  during the extrusion or
  after the extrusion by way of a forming process, such as for example by bending, is formed with a 2D or 3D curvature which is adapted to the spatial form of the glass pane at its pane edge, and
 c) that the edge protection strip is adhesively bonded to the glass pane in such a way that it forms the edge protection at the pane edge of the glass pane.

According to a preferred procedure, it is provided that the glass pane with the edge protection strip as claimed in one of claims 1 to 11 is formed.

According to a further preferred procedure, it is provided that the edge protection strip is formed as an angle profile having a fastening limb, which has a fastening or adhesive surface, and having a protective limb, which is angled with respect to the fastening limb and bears against the pane edge of the glass pane, the fastening limb being fastened to an edge strip, which adjoins the pane edge, of the bottom side of the glass pane by means of an adhesive bond.

Finally, it may be provided that the edge protection strip is formed as a hard plastics profile which is resistant to deformation and bending.

In particular, the bending of the edge protection strip in the case of an extruded part may be performed by subsequent heating in a contoured shape. In this way, in particular the 3D bends can be produced. It is also possible to produce the edge protection strip with a 2D bend during the extrusion operation, which is substantially more favorable in terms of manufacturing technology and is consequently preferred. The contours of the edge protection strip and of the glass pane at its respective pane edge can thereby be readily adapted to one another such that good applicability of the edge protection strip is ensured.

BRIEF DESCRIPTIONS OF THE DRAWINGS

The invention is explained in more detail below on the basis of one exemplary embodiment of a glass pane according to the invention with reference to the drawing, in which.

DETAILED DESCRIPTION

Figure 1:
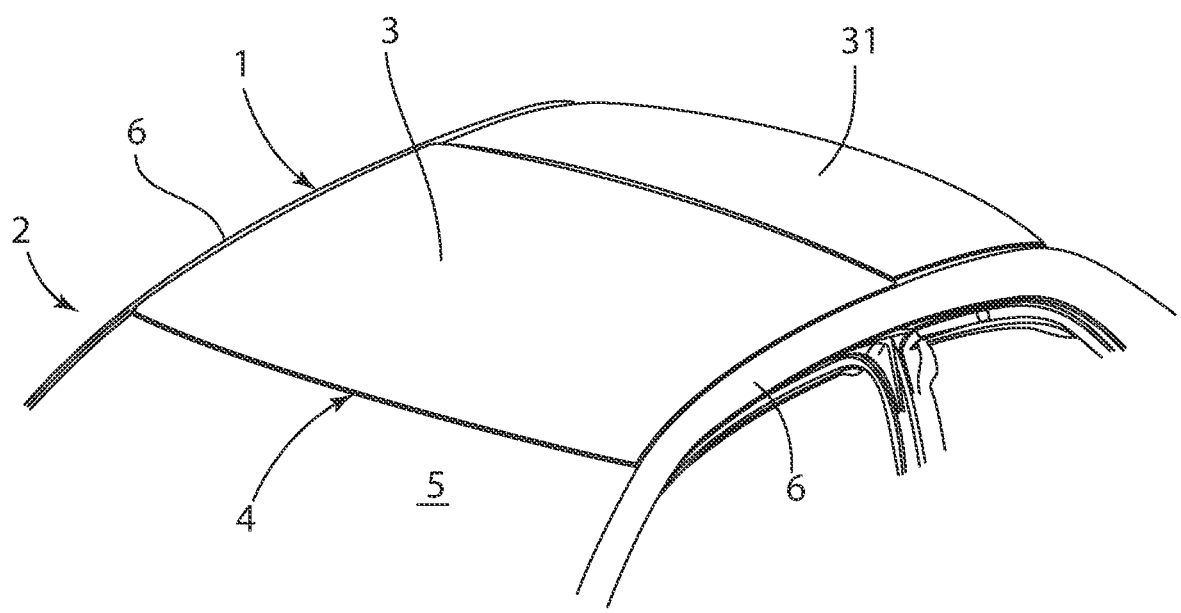
FIG. 1 shows an isometric view of a vehicle roof having a glass pane which subsequent to a windshield covers a surface region of the vehicle roof.
Figure 2:
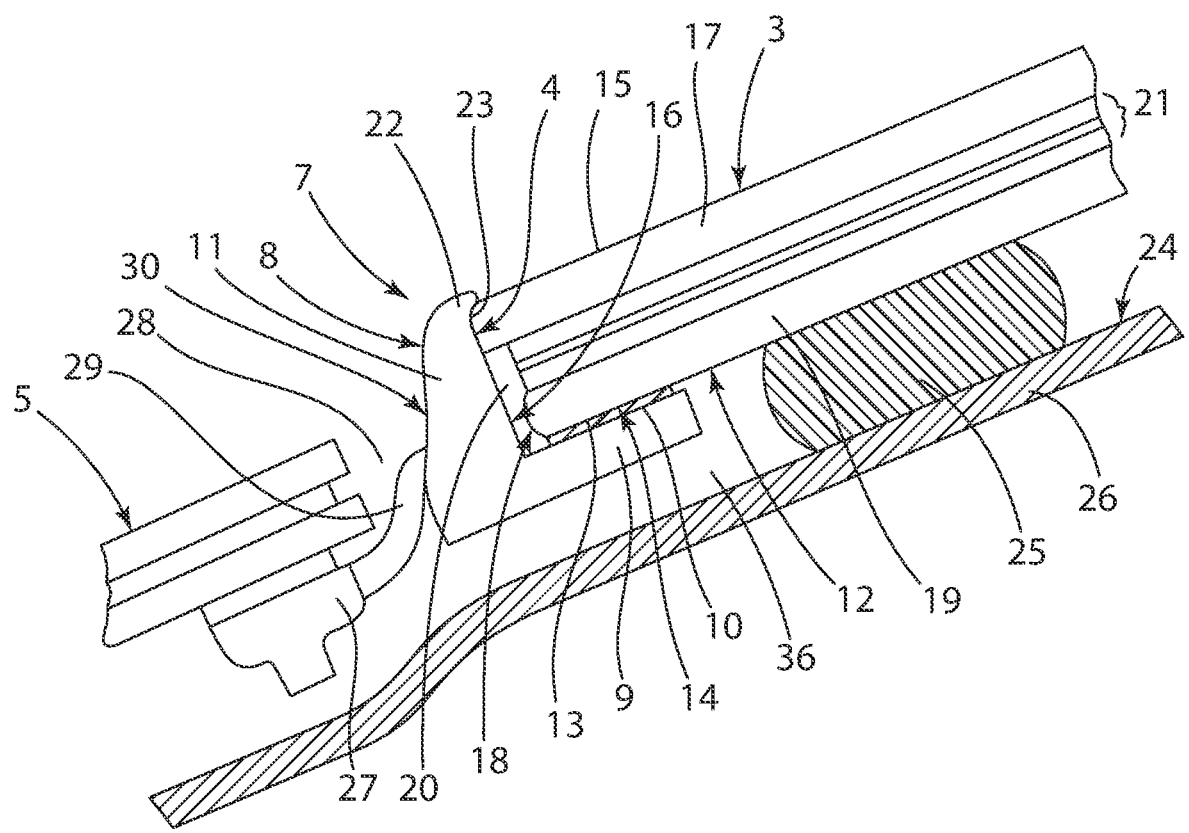
FIG. 2 shows a longitudinal sectional view of the vehicle roof with the windshield and a glass pane which adjoins it and which has an edge protection strip at its front pane edge.

A vehicle roof 1 (see FIG. 1) of a vehicle 2, such as for example of a passenger car, has a glass pane 3 which adjoins a windshield 5 by way of its front pane edge 4 and which is arranged on both sides on lateral roof longitudinal members 6. Such a glass pane 3 is part of a roof module, for example. Expediently, the glass pane 3 is fastened to the vehicle roof 1 by means of an adhesive bond. The front pane edge 4 of the glass pane 3 is provided with an edge protection 7 (FIG. 2). The edge protection 7 comprises an edge protection strip 8 which is formed as a deformation-resistant plastics profile. The edge protection strip 8 is produced in particular from a thermoplastic, such as for example from ASA (acrylonitrile styrene acrylate), by extrusion.

The edge protection strip 8 is fastened to the glass pane 3. The edge protection strip 8 has a fastening limb 9, which comprises a fastening or adhesive surface 10. Furthermore, the edge protection strip 8 has a protective limb 11, which is angled with respect to the fastening limb 9 and is formed substantially at a right angle with respect to the fastening limb 9. The edge protection strip 8 is fastened by means of its fastening limb 9 to a bottom side 12 of the glass pane 3 by means of an adhesive bond 13. The adhesive bond 13 is effected for example by means of an adhesive layer or an adhesive tape on the one hand on the fastening or adhesive surface 10 of the fastening limb 9 and on the other hand on an edge strip 14, which adjoins the pane edge 4, of the bottom side 12 of the glass pane 3.

The angled design of the fastening limb 9 relative to the protective limb 11 makes it possible to correctly position the edge protection strip 8 on the glass pane 3 in a simple manner. In particular, this makes it possible to fix the protective limb 11 in a defined position with respect to the top side 15 of the glass pane 3. The inner side 16 of the protective limb 11 bears against the pane edge 4. In dependence on the shape of the glass pane 3 at its pane edge 4, the inner side 16 of the protective limb 11 may bear for example against the total surface of the pane edge 4—as viewed in the direction of the thickness of the glass pane 3—or may make contact only in a strip-like contact region. If the glass pane 3 is a laminated safety glass (FIG. 2), the protective limb 11 expediently bears only against the pane edge 4 of an outer flat glass pane 17 of the laminated safety glass. The protective limb 11 may be spaced apart from the edge 18 of an inner flat glass pane 19 of the laminated safety glass, in particular if the edge 18 of the inner flat glass pane 19 is set back slightly in relation to the pane edge 4 of the outer flat glass pane 17. A free space or cavity 20 is provided between the protective limb 11 and a contour at the edge of the glass pane 3. The contour at the edge of the glass pane 3 is formed for example by the edge of a laminate layer 21 between the inner flat glass pane 19 and the outer flat glass pane 17 and by the edge 18 of the inner flat glass pane 19.

The free space or cavity 20 may accommodate for example a connection cable, which makes contact with a switchable film integrated in the glass pane 3 or between the inner flat glass pane 19 and the outer flat glass pane 17 or in or on the laminate layer 21. The free space or cavity 20 may additionally also be widened by a shaping of the edge protection strip 8 for example with an indentation or a groove.

The edge protection strip 8 or its protective limb 11 ends at approximately the same level as the top side 15 of the glass pane 3. A small protrusion of the protective limb 11 beyond the top side 15 of the glass pane 3 may also be provided, for example if the edge protection strip 8, which is formed with an upper protective lip 22, covers or overlaps an upper edge 23 of the glass pane 3 at its pane edge 4 by way of this protective lip 22. The upper edge 23 is for example rounded or provided with a chamfer, but may also be substantially angular. The edge protection strip 8 thus leaves the top side 15 of the glass pane 3, said top side adjoining the pane edge 4, free of cover or uncovered.

The edge protection strip 8 is expediently pre-formed so as to be adapted to a three-dimensional profile of the glass pane 3 at its pane edge 4 and is accordingly bent or curved. During the attachment of the pre-formed edge protection strip 8, it is then not necessary to deform or bend the edge protection strip 8 in order to adapt it to the shape or the profile of the glass pane 3 at its pane edge 4 and on its bottom side 15 in the region of the adhesive bond 13.

The glass pane 3 is fastened or adhesively bonded to a roof component of the vehicle roof 1, such as for example to a roof frame 26, by means of an adhesive bond 25, for example an adhesive bead. By way of example, the roof frame 26 delimits or surrounds a roof opening which is covered by the glass pane 3 or by a roof module containing the glass pane 3. The glass pane 3 is arranged so as to be spaced apart from a fastening or support surface 24 of the roof component, such that a distance or gap 36 is formed between the bottom side 12 of the glass pane 3 and the support surface 24 on which the adhesive bond 25 adheres.

The edge protection strip 8 is located with its fastening limb 9 in this distance or gap 36, which opens, proceeding from the adhesive bond 25, toward the pane edge 4.

The edge protection strip 8 is arranged so as to be spaced apart from the support surface 24 and thus so as to be contact-free with respect thereto. Support of the edge protection strip 8 on the support surface 24 is generally not required. However, the edge protection strip 8 may also have a supporting rib (not illustrated) which is formed integrally on the bottom side and which supports the edge protection strip 8 on the support surface 24.

Furthermore, the edge protection strip 8 may expediently be arranged so as to be spaced apart from the adhesive bond 25 of the glass pane 3 and thus so as to be contact-free with respect thereto.

Furthermore, it may be provided that the edge protection strip 8 is arranged so as to be contact-free with respect to a spaced-apart and adjoining roof surface component or with respect to the windshield 5. A seal 27, which seals a gap 28 with respect to a roof surface component which is adjacent to the pane edge 4 of the glass pane 3 or with respect to the windshield 5, may bear against the edge protection strip 8, for example against an external abutment surface 30 of the protective limb 11, by way of a flexible sealing lip 29. The seal 27 is fastened to the windshield 5, for example. The edge protection strip 8 is expediently formed with a chamfered or inclined abutment surface 30 of the protective limb 11 (see FIG. 2). In this way, adaptive tight abutment of the sealing lip 29 is ensured for each installation position, lying within the tolerance range, of the glass pane 3 which is adhesively bonded to the support surface 24. The shape of the abutment surface 30 is in particular adapted to the shape of the vehicle roof, such as for example to the shape of a roof longitudinal member, or matches the latter, in the region in which a sealing lip for example of a decorative roof bar bears, said sealing lip covering a join between the roof longitudinal member and the bonded glass pane. Such substantially matching abutment surfaces thus represent identical sealing conditions for the seals.

Figure 3:
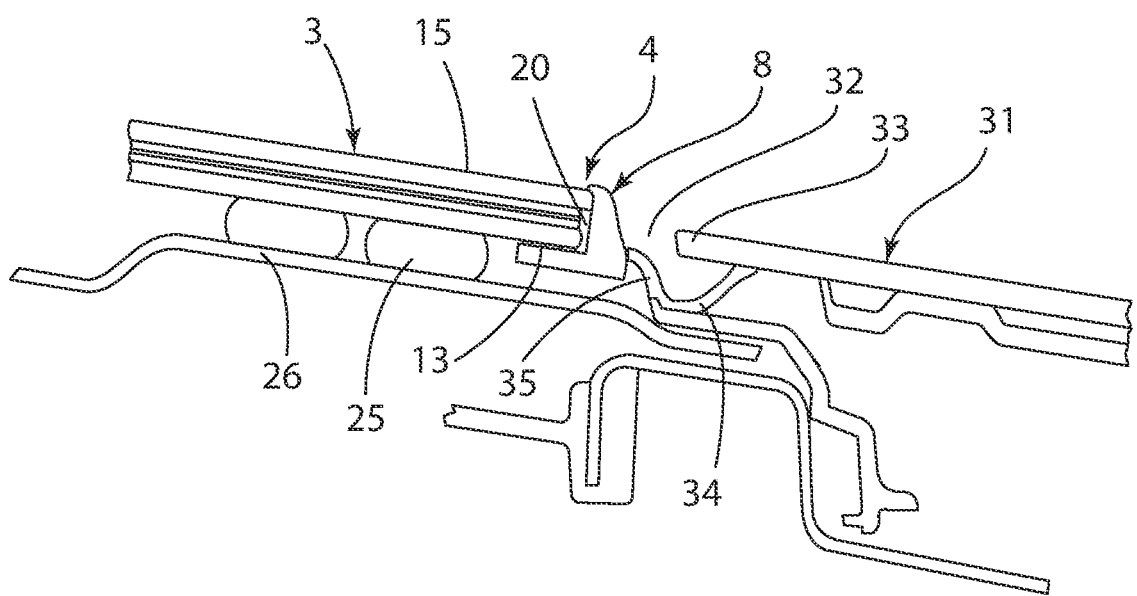
FIG. 3 shows a longitudinal sectional view of the vehicle roof with the glass pane and a rear roof surface component and an edge protection strip attached to the rear pane edge of the glass pane.

FIG. 3 shows a glass pane 3 which is attached to the vehicle roof 1 and which has an edge protection strip 8 attached to its rear pane edge 4. This edge protection strip 8 corresponds to the edge protection strip 8 which is attached to the front pane edge 4. The upper edge of the protective limb 11 of the edge protection strip 8 can be arranged below the top side 15 of the glass pane 3, since stone chipping will not occur at the rear pane edge 4. Here, too, a free space or cavity 20 may be provided between the edge protection strip 8 and the rear pane edge 4.

A roof surface component 31, which is arranged behind the glass pane 3 in the roof longitudinal direction and which is separated therefrom via a gap 32, is for example a part which is fixedly attached to the vehicle roof 1 or a part which can be pivoted with a tailgate. A seal 34 which is attached to or under the front edge 33 of the roof surface component 31 bears against the edge protection strip 8 by way of a sealing lip 35.

In principle, the edge protection strip 8 may also be attached to a glass lamella or glass panel which adjoins the upper edge of the windshield 5 or to another glass surface component of the vehicle roof or of a roof module.

| List of reference designations | |
|---|---|
| 1 | Vehicle roof |
| 2 | Vehicle |
| 3 | Glass pane |
| 4 | Pane edge |
| 5 | Windshield |
| 6 | Roof longitudinal member |
| 7 | Edge protection |
| 8 | Edge protection strip |
| 9 | Fastening limb |
| 10 | Fastening or adhesive surface |
| 11 | Protective limb |
| 12 | Bottom side |
| 13 | Adhesive bond |
| 14 | Edge strip |
| 15 | Top side |
| 16 | Inner side |
| 17 | Outer flat glass pane |
| 18 | Edge |
| 19 | Inner flat glass pane |
| 20 | Free space or cavity |
| 21 | Laminate layer |
| 22 | Protective lip |
| 23 | Edge |
| 24 | Support surface |
| 25 | Adhesive bond |
| 26 | Roof frame |
| 27 | Seal |
| 28 | Gap |
| 29 | Sealing lip |
| 30 | Abutment surface |
| 31 | Roof surface component |
| 32 | Gap |
| 33 | Front edge |
| 34 | Seal |
| 35 | Sealing lip |
| 36 | Gap |

The invention claimed is:

1. A glass pane which covers a surface region of a vehicle roof and has an edge protection at a pane edge of the glass pane,
    wherein the glass pane is configured to be elevated above the plane of an adjoining vehicle roof surface component or of an adjacent windshield;
    wherein the edge protection is formed by an edge protection strip which covers the elevated glass pane at its pane edge against impacting articles,
    wherein the edge protection strip is formed as an angle profile having a fastening limb, which has a fastening or adhesive surface, and having a protective limb, which is angled perpendicularly with respect to the fastening limb and bears against the elevated pane edge of the glass pane,
    the fastening limb being fastened to an edge strip, which adjoins the elevated pane edge, of the bottom side of the elevated glass pane by an adhesive bond, and
    wherein the edge protection strip is formed as a hard plastics profile which is resistant to deformation and bending.

2. The glass pane as claimed in claim 1, wherein the edge protection strip is formed as an angle profile and covers the pane edge and the edge strip of a bottom side of the glass pane.

3. The glass pane as claimed in claim 1, wherein the protective limb ends at the same level as a top side of the glass pane or extends over an upper edge of the glass pane at its pane edge.

4. The glass pane as claimed in claim 1, wherein the glass pane has a pane edge which extends in a three-dimensionally curved manner and
    wherein the edge protection strip has a curved shape which is adapted to this profile of the pane edge.

5. The glass pane as claimed in claim 1, wherein the edge protection strip is formed as a plastics profile composed of a plastics material with a bending modulus in the range of greater than 2000 MPa.

6. The glass pane as claimed in claim 1, wherein the edge protection strip is formed as a plastics profile composed of a plastics material with a Shore A hardness of greater than 100.

7. The glass pane as claimed in claim 1, wherein the edge protection strip is formed from a thermoplastic material.

8. The glass pane as claimed in claim 1, wherein the edge protection strip is formed from ASA (acrylonitrile styrene acrylate).

9. The glass pane as claimed in claim 1, wherein a free space or cavity is formed between the edge protection strip attached to the pane edge and a region of the pane edge.

10. A vehicle roof having a glass pane as claimed in claim 1,
    wherein the glass pane is adhesively bonded to a support surface of a roof component of the vehicle roof so as to form a gap between the glass pane and the support surface, and
    wherein the edge protection strip is arranged so as to be contact-free with respect to the support surface and/or contact-free with respect to the adhesive bond of the glass pane to the support surface.

11. The vehicle roof as claimed in claim 10, wherein the edge protection strip is arranged so as to be contact-free with respect to a spaced-apart and adjoining roof surface component.

12. The vehicle roof as claimed in claim 10, wherein a seal, which seals a gap with respect to a roof surface component which is adjacent to the pane edge of the glass pane, bears against the edge protection strip by way of a flexible sealing lip.

13. The glass pane as claimed in claim 1, wherein the edge protection strip is formed as an extruded plastics profile.

* * * * *